Nov. 3, 1942.  B. Q. JONES  2,300,424
MULTIPLE DIFFERENTIAL
Filed Sept. 11, 1941
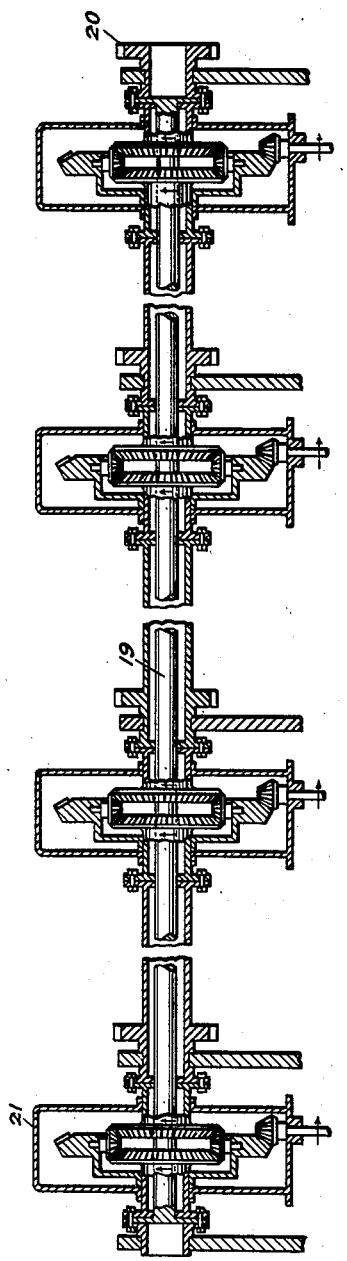
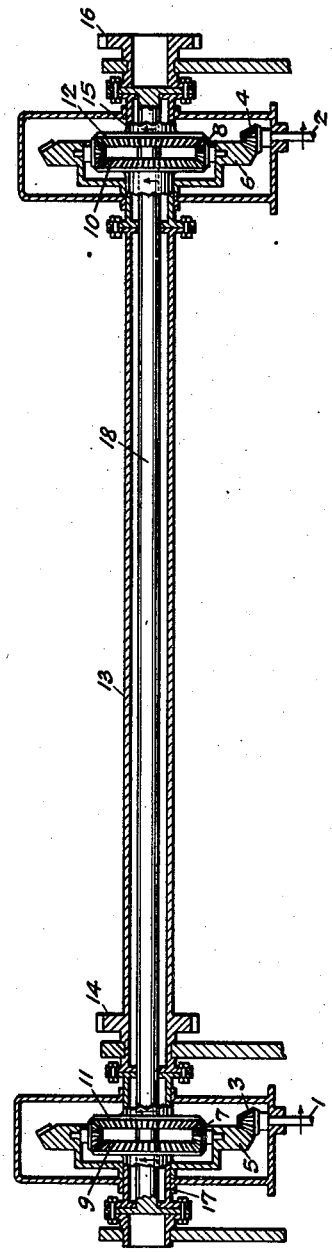
Inventor
Byron Q. Jones
By G. J. Kesenich & J. H. Church
Attorneys Patented Nov. 3, 1942

2,300,424

UNITED STATES PATENT OFFICE 2,300,424

MULTIPLE DIFFERENTIAL

Byron Q. Jones, United States Army, Fort Knox, Ky.

Application September 11, 1941, Serial No. 410,440

5 Claims. (Cl. 74—282)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to differential gearing for automotive vehicles and especially to a type adapted for vehicles having two or more drive wheels and a power source for each wheel.

It is an object of the invention to provide not only for the normal differential action at each wheel but also provide for distribution of power to a wheel when the power thereof fails. The distribution of power is unbroken if no two consecutive power sources are out of service. In the latter case one wheel will be isolated from the power. The transmission of power to adjacent wheels is maintained in an unbroken chain by an auxiliary shaft between the end wheels.

The specific nature of the invention as well as other objects and advantages thereof will clearly appear from a description of a preferred embodiment as shown in the accompanying drawing in which:

Figure 1 is an axial sectional view of a two-unit gear housing, and

Figure 2 is a similar view showing a gear housing of more than two units.

Referring to the drawing by characters of reference, there is shown in Figure 1 drive shafts 1 and 2 with bevel gears 3 and 4 respectively meshing with ring gears 5 and 6. The ring gears carry planetary gears 7 and 8 engaging respectively with sun gears 9, 11 and 10, 12. A hollow shaft 13 is mounted so as to form a continuous unit between sun gears 11 and 10 and the shaft carries a sprocket 14 which forms the connection with a vehicle wheel.

Sun gear 12 is fixed to a shaft 15 which carries a sprocket 16, and shaft 15 is connected to a shaft 17 and hence sun gear 9 through a shaft 18 running centrally back through the system.

When both shafts 1 and 2 are delivering power the action is normal and the sun gears are all carried in unison by the planets to turn the vehicle wheels. For turning corners the differentials function in the normal and well-known manner.

If, however, one of the motors is out of service the power from the remaining motor will be distributed to both wheels. For instance, assume that the motor at shaft 1 is not running. In this case sun gear 10 will carry gear 14 and sun gear 12 will carry sprocket 16. Conversely, if the motor at shaft 2 is out, sun gear 11 will carry sprocket 14 and sun gear 9 will carry sprocket 16 through the intermediary of shaft 18.

As shown in Figure 2, the system is extended to include four differential units and hence four wheel-driving sprockets.

It will be seen that each unit will function to carry the sprocket to its left if the latter is disabled as well as its own sprocket at its right and all other operating units contribute to this result, since under normal functioning the power distribution is unbroken throughout the system.

The auxiliary shaft 19 closes the chain of distribution and functions to operate sprocket 20 the same as if the latter were located to the left of gear housing 21. It is only when two adjacent power sources are out of service that the chain is broken, in which case one wheel drive will fail. Two drives will fail if three motors are out and so on. It is significant to note that the end drives are, operatively, adjacent, and so one will always drive the other. For this reason an unbalanced drive will not occur, for either both or neither of the end drives will function. If neither functions, the drive is still balanced as to the centrally located units. In the absence of such things as shaft or gear failures the vehicle will never be driven by a single wheel, two being the minimum.

It is to be noted that the construction of the instant device for mass production is facilitated by the fact that most of the parts are standard, such as the coupling between inner and outer shafts, the differential gear units, the gear housings and the sprockets.

I claim:

1. In a vehicle, a plurality of sources of power, a differential gearing system for each source, a shaft connecting units of the differentials between adjacent systems and an auxiliary shaft forming a direct connection between the end units of the end systems.

2. In a vehicle, a plurality of sources of power, a differential gearing system for each source, a shaft connecting units of the differentials between adjacent systems and an auxiliary shaft running axially of said first mentioned shaft and connecting the end units of the end systems.

3. In a vehicle, a plurality of sources of power, a differential gearing system for each source comprising sun gears, a ring gear moved by the source of power and carrying planetary gears to operate the sun gears differentially, a shaft connecting sun gears between adjacent systems and an auxiliary shaft forming a direct connection between the end units of the end systems.

4. In a vehicle, a plurality of sources of power, a differential gearing system for each source comprising sun gears, a ring gear moved by the source of power and carrying planetary gears to operate the sun gears differentially, a shaft connecting sun gears between adjacent systems and an auxiliary shaft running axially of said first mentioned shaft and connecting the end units of the end systems.

5. In a vehicle as in claim 4, wheel driving means on each of said first mentioned shafts and on said auxiliary shaft adjacent an end thereof.

BYRON Q. JONES.